United States Patent Office 3,386,856
Patented June 4, 1968

3,386,856
METHOD OF MAKING A MANGANESE OXIDE DIELECTRIC COATING FOR BARRIER-LAYER CAPACITORS
Willem Noorlander, Emmasingel, Eindhoven, Netherlands, assignor to North American Philips Company, Inc., New York, N.Y., a corporation of Delaware
No Drawing. Filed Nov. 12, 1964, Ser. No. 410,794
Claims priority, application Netherlands, Dec. 13, 1963, 301,822
12 Claims. (Cl. 117—200)

ABSTRACT OF THE DISCLOSURE

A method of making a device of the type comprising a body of sintered semiconductive oxidic dielectric material having electrodes and a barrier-layer between the electrodes, useful especially as a barrier-layer capacitor. Preferred materials are alkaline earth titanates containing an additive for rendering same semiconductive. The method involves including in the electrode material or under the electrode material manganese or a manganese compound, and heating in an oxygen-containing atmosphere to oxidize the surface of the body to produce an insulating junction layer. The resultant device exhibits a high reverse voltage without any substantial reduction in capacitance. Improved capacitors are obtained especially in miniature form.

---

The invention relates to a method of manufacturing a device consisting mainly of oxidic dielectric material and to a device manufactured by this method. A device in accordance with the invention comprises a body which consists mainly of sintered semiconductive oxidic dielectric material, is provided with electrodes and includes at least one barrier layer. Such a device may be used, for example, as a thermistor, varistor or rectifier and especially as a barrier-layer capacitor.

It is known to manufacture such a device by starting from a sintered body consisting of alkaline earth titanates. The sintered body is subjected to a reduction treatment over its entire surface area so that a semiconductor having a high dielectric constant is produced. Two electrodes are then provided on the semiconductive body in a manner such that under at least one electrode in the body an insulating junction of small thickness is produced. It has now been found that the resulting barrier-layer capacitors generally do not satisfy the requirements with respect, for example, to reverse voltage and capacitance value to be fulfilled by such capacitors in the rapidly progressing state of the art, especially in the field of the miniaturization of electrical equipment.

The term "reverse voltage" is used herein to mean the voltage, expressed in volts, at which a current of 1 microampere flows with an electrode area of 0.2 sq. cm.

Applicant has tried to manufacture barrier-layer capacitors of the above-mentioned kind which satisfy the aforementioned requirements and particularly have a reverse voltage which is high for barrier-layer capacitors mainly consisting of an oxidic dielectric material and also have a capacitance value per sq. cm. which is comparatively high for such capacitors.

It has been found that steps conducive to an increase in the reverse voltage of such capacitors generally result in a decrease of the capacitance value per sq. cm., and conversely, and also that when using an oxidic dielectric material rendered semiconductive by additives, with or without a treatment in a reducing atmosphere, no high value of the reverse voltage is obtained by the known method; this would appear to be due to the fact that this material is not readily re-oxidizable. The said additives are those capable of rendering the material semiconductive with or without a treatment in a reducing atmosphere.

Applicant has now found a method which surprisingly permits the manufacture of such barrier-layer capacitors having a high reverse voltage and also a comparatively high capacitance value per sq. cm.

The method in accordance with the invention is based on the recognition that such barrier-layer capacitors can be obtained by promoting the re-oxidation at the surface of the semiconductor body. It has been found that this is achieved when this re-oxidation is carried out in the presence of manganese or a manganese compound on the junction layer to be oxidized; this is the layer on which the electrode is provided.

The invention relates to a method of manufacturing a device comprising a body which mainly consists of sintered semiconductive oxidic dielectric material and is provided with electrodes, at least one of the surfaces of the body on which electrodes are provided being superificially oxidized until an insulating junction layer has been formed, and is characterized in that the oxidization is carried out in the presence of manganese or a manganese compound on or in the junction layer to be oxidized.

The sintered body may consist mainly of a known oxidic dielectric material. Preferably such a material is used which has a high dielectric constant. Examples of such a material are titanates, zirconates and stannates of alkaline earth metals and lead, titanium dioxide and mixtures of the said compounds which may be rendered semiconductive by an additive, with or without a treatment in a reducing atmosphere such, for example, as are described in British Patent 714,965 and United States Patent 2,735,824. Suitable materials are especially alkaline earth titanates containing as an additive an oxide of a rare earth metal, such as lanthanum or cerium, or, for example, antimony, niobium, yttrium or bismuth. A particularly suitable material is that which mainly consists of barium titanate or barium strontium titanate containing as an additive an oxide of a rare earth metal, especially lanthanum oxide, or antimony oxide and particularly a material in which the mole ratio $BaO:SrO:TiO_2$ is equal to 35–45:7–15:48–55. Examples of barium strontium titanates are those in which the mole ratio $$BaO:SrO:TiO_2 = 18:7:26$$

and which further contain 0.1% by weight of $La_2O_3$, and those in which the mole ratio $BaO:SrO:TiO_2 = 40:10:50$ and which further contain 0.3% by weight of $Sb_2O_3$.

A semiconductor body consisting of an oxidic dielectric material may be manufactured by a known method. For example, an intimate mixture of the respective oxides or of compounds which on heating are converted into oxides or of both such oxides and such compounds may be compressed to form a disc which may be heated in air to a temperature between 1200° C. and 1400° C. for from 30 to 60 minutes.

The reduction of the resulting body may be effected, for example, by heating it in hydrogen to a temperature of from 1000° C. to 1500° C. for from 30 to 60 minutes.

The provision of electrodes may be performed in a manner known for the provision of electrodes on such a body, for example, by applying a silver paste mainly consisting of silver and a volatile or combustible diluent to the respective surfaces of the body and subsequently heating the body in air to a temperature of about 720° C. Electrodes may alternatively be provided by the deposition of nickel from the vapor phase.

The surface oxidation in which an insulating junction layer is produced in the semiconductor body may be performed in a variety of manners and in various stages of the process of manufacturing the device in accordance with the invention. This oxidation may, for example, be effected before the electrodes are provided. In a preferred method, however, the provision of electrodes and the surface oxidation are carried out in the same operation.

Since in the method in accordance with the invention the surface oxidation of the semiconductor body is effected in the presence of manganese or a manganese compound, this metal or such compound will generally be previously provided on the surface to be oxidized.

If the surface oxidation is effected before the provision of electrodes the manganese may, for example, be provided by deposition from the vapour phase, or a manganese compound may, for example, be provided by wetting the surface to be oxidized with a solution of the compound, for example, an aqueous solution of manganese nitrate, and, if required, by subsequent drying. These operations may be repeated before the oxidation is performed. After the provision of manganese or a manganese compound the surface oxidation may be carried out, for example, by heating the treated semiconductor body in air to a temperature of from 700° C. to 900° C. Subsequently electrodes may be provided in known manner.

If the surface oxidization and the provision of electrodes are carried out in the same operation, manganese or a manganese compound may previously be provided on the surface to be oxidized, for example, in the aforedescribed manner. In this case manganese or a manganese compound will preferably be incorporated in the material with the aid of which electrodes are provided. A suitable method is that in which for the provision of electrodes a suspension of solder is used which mainly consists of finely divided silver and a volatile or combustible diluent and to which manganese or a manganese compound is added. For providing electrodes a silver paste may advantageously be used which contains a few percent of a manganese-containing enamel.

The surface oxidation may be effected by heating the treated semiconductor body in an atmosphere containing oxygen, for example, in air, to a temperature between 700° C. and 900° C. for from 5 to 30 minutes.

The electrical properties, particularly the reverse voltage and the capacitance value, of capacitors manufactured by the method in accordance with the invention are quantitatively determined by several factors, one of which is the composition of the oxidic dielectric material used. Another factor determining these parameters is the amount of manganese or manganese compound applied to the surface to be oxidized. For each case a dose of manganese or manganese compounds can be given at which a maximum reverse voltage or optimum values for reverse voltage and capacitance value of the resulting capacitor are achieved. This optimum dose can readily be determined in each individual case on the basis of what has been stated hereinbefore by carrying out a few systematic tests. This may be effected, for example, by carrying out the method to be described hereinafter with the use of different amounts of manganese or manganese compounds.

The method in accordance with the invention will now be described in greater detail with reference to the following examples.

EXAMPLE 1

Manufacture starts from an intimate mixture consisting of 36 mol. percent of $BaCO_3$, 14 mol. percent of $SrCO_3$ and 50 mol. percent of $TiO_2$, to which, after prefiring, was added an amount of $La_2O_3$ corresponding to 0.3 mol. percent of $La_2O_3$ of the resulting mixture. From this mixture strips of 200 x 5 x 0.5 cu. mm. were pressed. These strips were heated in a furnace to a temperature of about 1,300° C. in an oxidizing atmosphere (air) for about 60 minutes and subsequently reduction was carried out by heating the strips in a mixture of nitrogen and hydrogen (3:1) at a temperature of about 1450° C.

To provide electrodes such a semiconductive strip was immersed in a mixture consisting of 60 parts by weight of finely divided silver (obtained by reduction of silver oxide), 20 parts by weight of polyvinyl acetate, 15 parts by weight of ethylene glycol and 5 parts by weight of a finely divided enamel made from 5 parts by weight of $SiO_2$, 17 parts by weight of $B_2O_3$, 75 parts by weight of PbO and A parts by weight of $MnO_2$. After the immersion the strip was dried in air. Both the immersion and the drying were repeated twice. The silver-containing mixture was then removed from the lateral faces of the strip and the strip was divided into lengths of about 5 mm. These lengths were heated to 840° C. in air for about 10 minutes. In this process silver electrodes were fired to the lengths and the junction layers under the electrodes were oxidized.

In the manner described tests were made with silver-containing mixtures having different proportions of manganese compound; these proportions are shown in the Table I as A parts by weight of $MnO_2$ in the mixture from which the enamel was made.

The results of these tests are given in Table I. Column 1 of this table gives the value of A, Column 2 the capacitance value in $\mu f.$ per sq. cm. and Column 3 the reverse voltage in volts of the capacitors obtained. As stated hereinbefore, the reverse voltage is the voltage at which a current of 1 microampere flows with an electrode area of 0.5 sq. cm.

TABLE I

| A | Capacitance value in $\mu f.$ per sq. cm. | Reverse voltage in volts |
| --- | --- | --- |
| 0.0 | 378 | 1.7 |
| 0.5 | 373 | 2.9 |
| 1.0 | 384 | 5.4 |
| 2.0 | 349 | 5.4 |
| 5.0 | 369 | 6.0 |

This table shows that the use of a manganese compound enables the reverse voltage to be appreciably increased with respect to that obtained if no manganese compound is used ($A=0.0$), and also that the capacitance value is unimpaired or substantially unimpaired. It should be noted that the method in which no manganese compound is used ($A=0.0$) corresponds to the known method of manufacturing barrier-layer capacitors consisting mainly of an oxidic dielectric material.

By means of tests similar to those described for manufacturing barrier-layer capacitors consisting mainly of barium strontium titanates containing a slight amount of lanthanum oxide, by which tests the influence exerted by the amount of manganese compounds used on the reverse voltages and the capacitance values of the capacitors is determined, for manufacturing barrier layer capacitors consisting mainly of another oxidic dielectric material the amount of manganese or manganese compound to be used in order to obtain optimum values of the reverse voltage and the capacitance may readily be determined.

In the method described, the $MnO_2$ may be replaced by another manganese compound, for example, manganese nitrate, manganese carbonate or $Mn_2O_3$ or by metallic manganese.

By a method similar to that described barrier-layer capacitors were manufactured with the use of other oxidic dielectric materials. In this manufacture the electrodes are provided by the method described with the use of a silver-containing mixture as stated, with the understanding that the constituent from which the enamel is obtained contains 1 part by weight of $MnO_2$ (that is to say A is always equal to 1). For comparison, in each case capacitors were made by the same method in which no manganese compound was used in the silver-containing mixture employed for providing the electrodes.

In Table II the compositions of the oxidic dielectric materials used, the capacitance values per sq. cm. and the reverse voltages are given in volts both for capacitors in the manufacture of which no manganese compound was used (indicated by $A=0$) and for capacitors in which a manganese compound was used (indicated by $A=1$).

TABLE II

| Composition of the dielectric material | A | Capacitance value in µf. per sq. cm. | Reverse voltage in volts |
|---|---|---|---|
| SrTiO₃+0.3 by weight La₂O₃ | 0 | 12 | 1 |
|  | 1 | 4 | 30 |
| CaTiO₃+0.3 by weight Nb₂O₅ | 0 | 37 | 6 |
|  | 1 | 8 | 30 |
| MgTiO₃+0.3 by weight Sb₂O₃ | 0 | 1.4 | 1 |
|  | 1 | 0.9 | 27 |
| TiO₂+0.5 by weight Nb₂O₅ | 0 | 180 | 2 |
|  | 1 | 28 | 20 |
| BaO+SrO+TiO₂, 40+10+50 mol. percent and 0.3 by weight Sb₂O₃ | 0 | 263 | 1.5 |
|  | 1 | 214 | 19 |

Table II shows that the use of a manganese compound ($A=1.0$) permits of manufacturing capacitors having reverse voltages which are considerably higher than in capacitors made by the (known) method in which no manganese compound is used ($A=0.0$) while at the same time satisfactory capacitance values may be obtained.

To those skilled in the art it will be obvious that capacitors manufactured by the method in accordance with the invention may be employed to particular advantage in cases where miniaturization of electrical equipment is important.

EXAMPLE 2

By a method similar to that described in Example 1 barrier layer capacitors were manufactured with the use of the Ba:Sr:La titanate oxidic dielectric material employed in said example. However, a manganese compound was applied in a different manner. In order to apply a manganese compound to the junction layers to be oxidized the semiconductive strips were immersed in a 30% by weight solution of manganese nitrate in water. The immersion process was performed twice before electrodes were provided. After each immersion the strips were heated in air to a temperature of about 500° C. for 5 minutes.

In this manner barrier layer capacitors were obtained which had a reverse voltage of 5.7 volts and a capacitance value of 315 µf. per sq. cm.

Capacitors made by a similar method, in which, however, the semiconductive strips were not immersed in a solution of a manganese compound, exhibited a reverse voltage of 1.6 volts.

Thus this example shows that the provision of a manganese compound on the junction layer of the semiconductor body the surface of which is to be oxidized also leads to capacitors having high reverse voltages if the application of the manganese compound is effected before the provision of the electrodes.

EXAMPLE 3

Manganese may also be applied in the form of a metal to the junction layer of the semiconductor body the surface of which is to be oxidized.

Metallic manganese was deposited in known manner on opposite surfaces of a strip of semiconductor material as described in Example 1 in a vacuum bell jar so as to produce layers having a thickness of about 1 micron. The strip was then heated in air to about 900° C. for about 10 minutes. At this temperature manganese is oxidized.

The method was further carried out similarly to that described in Example 2.

The resulting barrier-layer capacitors exhibited a reverse voltage of about 6 volts and a capacitance value of about 750 µf. per sq. cm.

In a case in which the strip was heated in air to about 800° C. after the deposition of the manganese from the vapour phase the resulting capacitor had a reverse voltage of 5.8 v.

Capacitors which were manufactured by the same method but for the fact that the deposition of manganese from the vapour phase was dispensed with, had a reverse voltage of only 1.6 volts.

It has also been found that the results obtained by the use of manganese can be further improved if the material with the aid of which electrodes are provided also contain a metal or a compound, and preferably an oxide, of a metal of the group consisting of lanthanum, niobium, tungsten and molybdenum.

Table III shows the results of tests made in the manner described in Example 1 with the materials described in this example, with the understanding that the enamel which was used for providing electrodes contained, in addition to 1% by weight of MnO₂, 1% by weight of an oxide of one of the aforementioned metals (indicated in the table by "metal oxide added").

TABLE III

| Metal oxide added | Capacitance value in µf. per sq. cm. | Reverse voltage in volts |
|---|---|---|
| None | 299 | 5.7 |
| La₂O₃ | 253 | 8.8 |
| Nb₂O₃ | 394 | 7.9 |
| WO₃ | 326 | 7.0 |
| MoO₃ | 424 | 6.4 |

What is claimed is:

1. A method of manufacturing an electrical circuit element comprising a body of a semiconductive, oxidic, dielectric material comprised mainly of a titanate of at least one alkaline earth metal and including an additive rendering it semiconductive and having electrodes, comprising the steps of providing an electrode material comprising a manganese-containing substance on at least one surface of the body and heating in an oxygen-containing atmosphere to superficially oxidize said one body surface to produce an insulating junction layer and simultaneously to provide an electrode connection thereto.

2. A method as claimed in claim 1 wherein the electrode material comprises a suspension of finely divided silver containing a substance selected from the group consisting of manganese and a manganese compound.

3. A method as claimed in claim 2 wherein the silver-containing suspension contains a manganese-containing enamel.

4. A method as claimed in claim 3 wherein the manganese-containing enamel in the silver-containing suspension comprises mainly lead oxide, B₂O₃ and SiO₂.

5. A method as claimed in claim 1 wherein the alkaline earth titanate is selected from the group consisting of barium titanate and barium strontium titanate.

6. A method as claimed in claim 5 wherein the alkaline earth titanate is barium strontium titanate in which the mole ratio of BaO:SrO:TiO₂=35–45:7–15:48–55.

7. A method as claimed in claim 6 wherein the barium strontium titanate has a mole ratio BaO:SrO:TiO₂ of about 18:7:26.

8. A method as claimed in claim 6 wherein the barium strontium titanate has a mole ratio BaO:SrO:TiO₂ of about 40:10:50.

9. A method as claimed in claim 1 wherein the additive is an oxide of a metal selected from the group consisting of a rare earth metal, antimony, niobium, bismuth, and yttrium.

10. A method as claimed in claim 1 wherein the oxidic dielectric material is titanium dioxide.

11. A method of manufacturing an electrical circuit element comprising a body of a semiconductive, oxidic, dielectric titanate material having electrodes, comprising the steps of providing on at least one surface of the body on which an electrode is to be provided a substance selected from the group consisting of manganese and a manganese compound selected from the group consisting of manganese nitrate, manganese carbonate and manganese oxide, heating in air at an elevated temperature to oxidize the said surface to produce an insulating junction layer, and providing an electrode on the said junction layer.

12. A method as set forth in claim 1 wherein the electrode material also includes a metal oxide selected from the group consisting of $La_2O_3$, $Nb_2O_3$, $WO_3$, and $MoO_3$.

References Cited

UNITED STATES PATENTS 3,258,826   7/1966   Boone et al. _____ 317—234 XR

WILLIAM L. JARVIS, *Primary Examiner.*